March 15, 1938. C. DICKEY 2,111,111
FRONT WHEEL MOUNTING FOR AUTOMOBILES
Filed Feb. 15, 1936 3 Sheets-Sheet 1

Inventor
Clyde Dickey,

By Clarence A. O'Brien and
Hyman Berman
Attorneys

March 15, 1938. C. DICKEY 2,111,111
FRONT WHEEL MOUNTING FOR AUTOMOBILES
Filed Feb. 15, 1936 3 Sheets-Sheet 2

Inventor
Clyde Dickey.

By Clarence A. O'Brien and
Hyman Berman Attorneys

March 15, 1938.　　　　　C. DICKEY　　　　　2,111,111
FRONT WHEEL MOUNTING FOR AUTOMOBILES
Filed Feb. 15, 1936　　　3 Sheets—Sheet 3
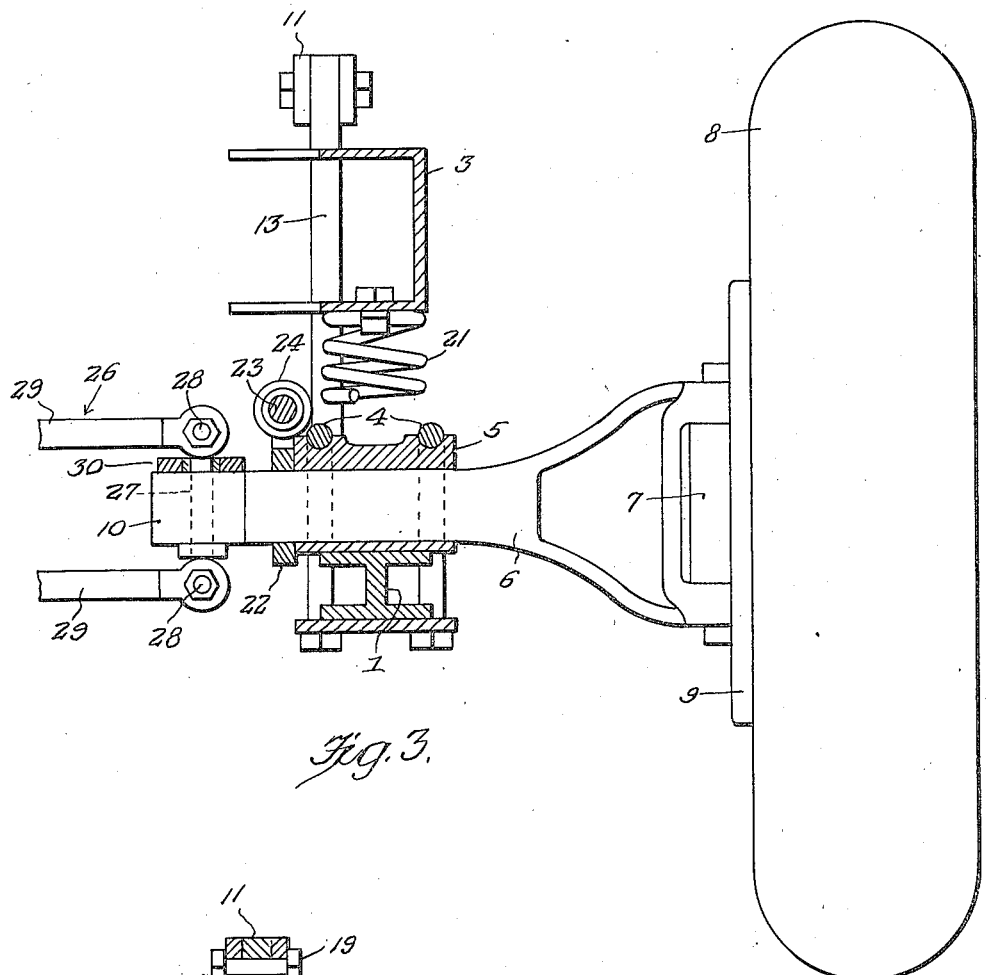
Fig. 3.
Fig. 4.
Fig. 5.
Inventor
Clyde Dickey,
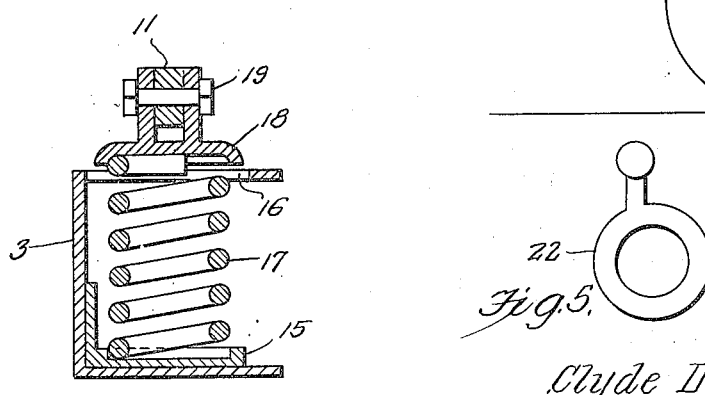
By Clarence A. O'Brien and
Hyman Berman
Attorneys Patented Mar. 15, 1938

2,111,111

UNITED STATES PATENT OFFICE 2,111,111

FRONT WHEEL MOUNTING FOR AUTOMOBILES

Clyde Dickey, Mount Vernon, Ill.

Application February 15, 1936, Serial No. 64,122

3 Claims. (Cl. 280—124)

The present invention relates to new and useful improvements in front wheel mountings for automobiles and has for its primary object to provide, in a manner as hereinafter set forth, a novel construction and arrangement for permitting independent movement of the front wheels as the vehicle travels over highways and streets.

Another important object of the invention is to provide independent wheel mountings for automobiles, including a pair of axles, independently movable vertically, together with means for automatically maintaining said axles in axially parallel relation at all times.

Other objects of the invention are to provide a front wheel mounting for automobiles of the aforementioned character which will be comparatively simple in construction, strong, durable, highly efficient and reliable in use, compact, light in weight, and which may be manufactured at a low cost.

All of the foregoing and still further objects and advantages of the invention will become apparent from a study of the following specification, taken in connection with the accompanying drawings wherein like characters of reference designate corresponding parts throughout the several views, and wherein:

Figure 3 is a view in vertical transverse section, taken substantially on the line 3—3 of Figure 1.

Figure 4 is a view in vertical transverse section, taken substantially on the line 4—4 of Figure 2.

Figure 5 is a detail view in side elevation of the collar which is fixed on each axle.

Figure 6 is a detail view in side elevation, showing a hydraulic shock absorber incorporated in the invention.

Figure 7 is a view in vertical transverse section through a modified form of the invention.

Figure 1:
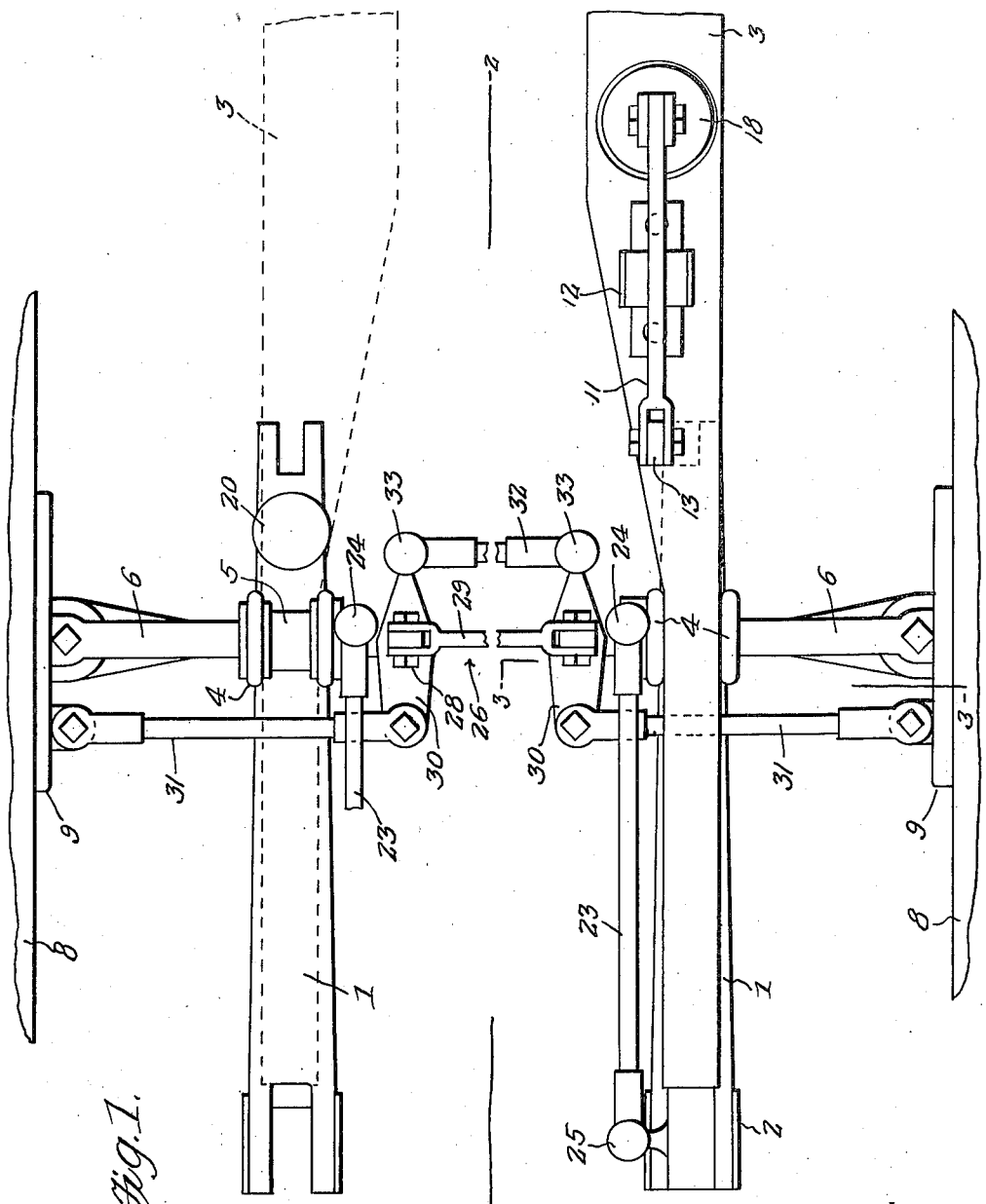
Figure 1 is a top plan view of the invention with parts on one side omitted.

Referring now to the drawings in detail, it will be seen that the reference numeral 1 designates a pair of arms which are pivotally connected at their forward ends, as at 2, to the front ends of the substantially channel-shaped side members 3 of the automobile frame. The arms 1 extend rearwardly beneath the frame side members 3 and secured on said arms, at an intermediate point, by U-bolts 4 are bearings 5. Rotatably and slidably mounted in the bearings 5 are axles 6 having mounted for swinging movement in a horizontal plane on their outer ends spindles 7 on which the front wheels 8 are journaled. Reference numeral 9 designates the usual brakes on the front wheels 8. The axles 6 terminate in square inner end portions 10.

Figure 2:
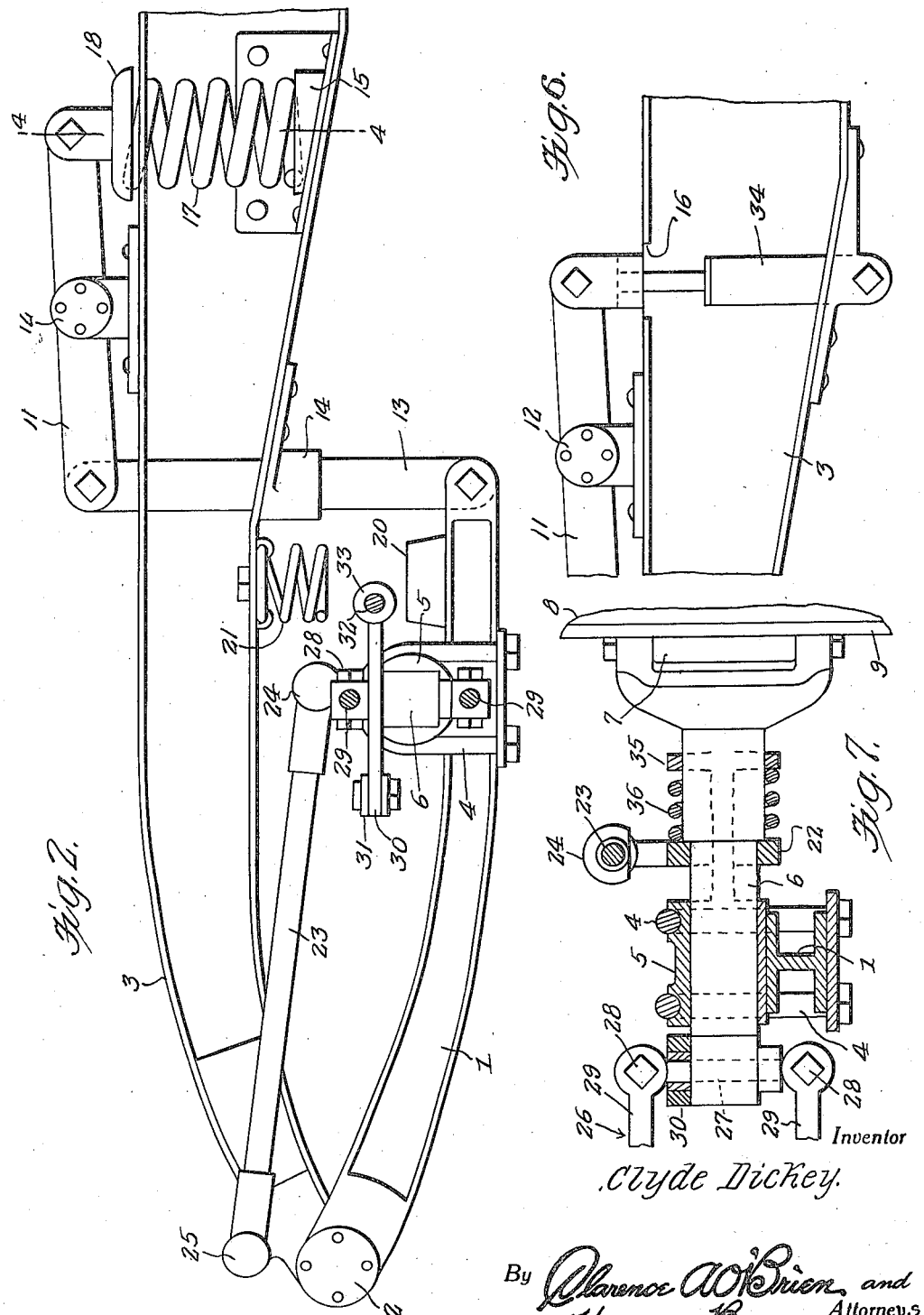
Figure 2 is a vertical longitudinal sectional view, taken substantially on the line 2—2 of Figure 1.

The reference numeral 11 designates levers which are pivotally mounted at an intermediate point, as at 12, on the side members 3 rearwardly from the forward ends of said side members. The rear ends of the arms 1 are operatively connected to one end of the levers 11 by links 13 which extend slidably through the frame members 3 and which travel in guides 14 on said members 3. As best seen in Figures 2 and 4 of the drawings, substantially cup-shaped bearings 15 are fixed on the lower flanges of the substantially channel-shaped side members 3 of the frame beneath openings 16 which are formed in the upper flanges of said side members. The bearings 15 are for the reception of shock absorbing coil springs 17 which the openings 16 accommodate and which have their upper ends engaged in cups 18 which are pivotally mounted on the rear end portions of the levers 11, as at 19. Blocks 20 are fixed on the arms 1 rearwardly of the axles 6 for engagement with bumper springs 21 which are mounted beneath the side members 3.

Fixed on the axles 6, as by welding, adjacent the inner ends of the bearings 5 are collars 22 to which struts 23 are connected by ball and socket joints 24. At their forward ends the struts 23 are connected by ball and socket joints 25 to the forward end portions of the frame members 3. This is illustrated to advantage in Figures 1 and 2 of the drawings.

The inner ends of the axles 6 are connected by a parallel link motion device which is designated generally by the reference numeral 26. The parallel motion device 26 comprises pins 27 which are journaled vertically in the inner end portions of the axles 6. Pivotally connected, as at 28, to the upper and lower ends of the pins 27 are parallel links 29.

The described sliding mounting of the axles 6 permits the links 29 to maintain the same in axially parallel relation during independent vertical movement thereof and for interconnection of the wheels 8, by said links 29, for steering movement about parallel vertical axes, i. e., the axes of the spindles 7. The reference numeral 30 designates a pair of steering levers which are pivotally mounted intermediate their ends on the upper ends of the pins 27 for horizontal swinging movement on the axle ends 10. Said levers extend forwardly and rearwardly of said ends. The rear ends of the levers 30 are connected together to swing in unison, by a rod 32 and ball and socket joints designated at 33. The front ends of the levers 30 are pivotally connected by motion transmitting rods 31 to the usual stationary back plates of the front wheel brake drums so that when either wheel 8 is swung, by means not shown, about the axis of its spindle 7, for steering purposes, similar motion will be imparted to the other wheel 8 by the described levers 30 and rods 31 and 32. As will be clear, the steering levers 30, and the rods 31 and 32 together with the described interconnecting means for the wheels 8 maintain the latter in parallel planes in any relative position of the axles 6.

In operation, the coil springs 17, through the levers 11 and the links 13, yieldingly support the weight of the vehicle on the vertically swinging arms 1. As the wheels 8 travel over irregularities or bumps in the street or highway the axles 6 are permitted to move vertically with the arms 1 but said axles are maintained in the previously described parallel relation by the parallel device 26. Also, as the axles 6 move up and down the torque action thereof is neutralized at all times by the struts 23. Sufficient play is allowed in the guides 14 of the links 13 to compensate for the slight arcs which will be described by the pivoted arms 1 and the levers 11. It will thus be seen that the front wheels 8 of the vehicle will be permitted to move vertically independently of each other. The elements 30, 31 and 32 connect the front wheels 8 for horizontal swinging movement in unison. In Figure 6 of the drawings, hydraulic shock absorbers 34 are substituted for the springs 17.

In Fig. 7 of the drawings, it will be seen that the collars 22 and the structure 23 are arranged outwardly of the arms 1 and the side members 3 of the automobile. In this modification, brackets 35 are extended from the bearings 5 and encircle the axles 6 outwardly of the collars 29. Then, coiled springs 36 are provided on the axles 6 between the brackets 35 and the collars 22. The springs 36 yieldingly urge the axles inwardly in the bearings 5 in a manner to substantially eliminate, or materially reduce, rattling by the elements 27 to 33 inclusive, and by compensating for, or taking up, wear between these parts.

It is believed that the many advantages of an independent front wheel mounting for automobiles constructed in accordance with the present invention will be readily understood, and although preferred embodiments are illustrated and described, it is to be understood that further modifications and changes in details of construction may be resorted to which will fall within the scope of the invention as claimed.

What is claimed is:

1. An independent front wheel mounting for automobiles comprising a pair of arms pivotally connected, at one end, to the forward ends of the automobile frame for swinging movement in a vertical plane, means yieldingly connecting the free ends of said arms to an intermediate portion of said frame, axles rotatably mounted on the arms, front wheels mounted on the axles for swinging movement, a parallel link motion device interconnecting the axles for maintaining said axles in parallel relation, struts connected to the axles for neutralizing torque action thereof, and means connecting the wheels together for swinging movement in unison.

2. An independent front wheel mounting for automobiles comprising a pair of arms pivotally connected, at one end, to the forward ends of the automobile frame for swinging movement in a vertical plane, means yieldingly connecting the free ends of said arms to an intermediate portion of said frame, axles rotatably mounted on the arms, front wheels mounted on the axles for swinging movement, a parallel link motion device inter-connecting the axles for maintaining said axles in parallel relation, struts connected to the axles for neutralizing torque action thereof, and means connecting the wheels together for swinging movement in unison, the last named means including levers pivotally mounted, at an intermediate point, on the axles, rods connecting the levers to the wheels for actuation thereby, and a rod connecting the levers together for swinging movement in unison.

3. An independent front wheel mounting for automobiles comprising a pair of arms pivotally connected, at one end, to the forward end of the frame of the automobile and extending rearwardly therebeneath, spaced axles journaled on said arms, wheels mounted for swinging movement in a horizontal plane on the outer ends of the axles, means yieldingly connecting the free ends of the arms to the automobile frame, pins mounted vertically in the inner end portions of the axles, parallel links pivotally connected to the upper and lower ends of said pins, levers journaled, at an intermediate point, for swinging movement about the pins, a rod connecting one end of the levers, and rods connecting the other ends of said levers to the wheels respectively.

CLYDE DICKEY.